(12) United States Patent
Arai et al.

(10) Patent No.: US 6,947,660 B2
(45) Date of Patent: Sep. 20, 2005

(54) MOTION PICTURE RECORDING/REPRODUCTION APPARATUS

(75) Inventors: Hideo Arai, Yokohama (JP); Yikitoshi Tsuboi, Yokohama (JP); Takashi Nishimura, Yokohama (JP); Eiichi Tanaka, Yokohama (JP); Akira Motosu, Yokohama (JP); Masuo Oku, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 197 days.

(21) Appl. No.: 10/653,857

(22) Filed: Sep. 2, 2003

(65) Prior Publication Data

US 2004/0076399 A1 Apr. 22, 2004

Related U.S. Application Data

(62) Division of application No. 09/383,486, filed on Aug. 26, 1999, now Pat. No. 6,643,453.

(30) Foreign Application Priority Data

Aug. 28, 1999 (JP) .............................................. 10-24322

(51) Int. Cl.[7] ............................ H04N 7/26; H04N 5/91
(52) U.S. Cl. ........................................ 386/109; 386/83
(58) Field of Search ................................ 386/109, 111, 386/112, 46, 124, 125, 40, 45, 52, 83, 27, 33, 1, 4

(56) References Cited

U.S. PATENT DOCUMENTS 5,377,051 A    12/1994 Lane et al.
5,497,243 A  * 3/1996 Sakata et al. ................... 386/52
5,535,008 A    7/1996 Yamagishi et al.

FOREIGN PATENT DOCUMENTS

EP    99306698          3/2000
JP    407065552 A  *   3/1995

OTHER PUBLICATIONS

*International Telecommunication Union*, Standard No. H.262 (Jul., 1995).
MSSG MPEG–2, Test Model 5 (document that pertains to MPEG–2 Video Main Profile).

* cited by examiner

*Primary Examiner*—Robert Chevalier
(74) *Attorney, Agent, or Firm*—Townsend and Townsend and Crew LLP

(57) ABSTRACT

The present invention makes possible recording motion pictures accurately starting at a point where a start recording event is received. The recording includes those pictures prior to the start recording event using a picture compressing method that compresses pictures both before and after the starting event, typically using the MPEG2 compression system. To make the above recording method possible, the present invention provides a signal processor and a photographic device that can search a motion vector for changing the object searching range properly, set an compression amount allocation for each picture type, and allow optimized parameters to be set when a start recording event is generated. The pictures processed before the start recording event is generated are stored in a memory buffer and on a recording medium so as to be used for recording or reproduction data entered after the recording starting time.

7 Claims, 12 Drawing Sheets

| PURPOSE | PICTURE FETCHING START 193 | RECORDING START COMMAND 194 |
|---|---|---|
| MPEG CAMERA | POWER ON OR RECORD PAUSE | START BUTTON OR RECORD START |
| MONITORING CAMERA | POWER ON | EVENT DETECTION |
| DRIVE RECORDER ON CAR | ENGINE START | COMMAND FROM DRIVER OR IMPACT DETECTION |
| STAY-AT-HOME VIDEO DISC RECORDER | POWER ON OR CHANNEL SELECTION | START BUTTON ON BY OPERATOR |

MOTION PICTURE RECORDING/REPRODUCTION APPARATUS

BACKGROUND OF THE INVENTION

This invention relates to a signal processing apparatus for recording or reproduction of digital motion pictures by compressing those pictures at a high efficiency, more particularly to a motion picture recording/reproduction apparatus enabling high quality pictures to be recorded when a start recording command is received, using a recording method with compression based on reference data that uses pictures recorded both before and after the start recording command.

The standard H.262 (referred to herein as "MPEG2") provides a known method for compressing motion pictures and audio. The standard is described in the ITU-T White Book, "Audio Visual/Multimedia Related (H series) Recommendations" (its translation was issued by Nihon ITU Kyokai, Feb. 18, 1995).

According to the MPEG2 method, a motion picture frame (or picture) is divided into rectangular blocks referred to as macro blocks. Each block typically comprises 16×16 pixels. Then, a region, referred to as a reference region, having a close resemblance to an object macro block to be compressed is extracted from pictures positioned both before and after the object picture. The differential from the orientation (motion vector) of the reference region, as well as the difference data between the reference region and the object region are computed. Those data are then compressed to a bit stream through DCT (discrete cosine transformation) and variable length compression processing. Such a method for compressing only the motion vector and the difference information is more efficient for compressing data than other methods for compressing the original pictures themselves. Thus, this method compresses data into a smaller amount of bit stream volume for a given amount of allowable compression. Pictures compressed by such difference data cannot be decompressed without a reference picture. Thus a picture that does not reference any other pictures must be provided periodically. To enable data decompression to be performed at an intermediate point of a bit stream (herein "random access") such reference pictures must be provided periodically. A picture which does not reference other pictures is referred to as an "I-picture" (Intra Picture). Such an I-picture is used as a reference picture, thereby permitting compression of later pictures. Then, a compressed picture can be used as another reference picture for compressing subsequent pictures one after another.

Pictures compressed with reference to other pictures are classified into P-pictures (Predictive-coded pictures) and B-pictures (Bidirectionally predictive-coded pictures). A P-picture uses a reference picture positioned only before the object picture, while a B-picture uses pictures positioned both before and after the object picture. Just like the I-picture, the P-picture can be used as a reference picture for other pictures.

FIG. 17 illustrates a configuration of motion picture frames compressed using I, P, and B pictures. In FIG. 17, reference numeral 121 indicates a picture type configuration composed in ascending order of input pictures. Picture types are compressed in units of 4 pictures in the order B, I, B, and P for pictures entered in ascending order of 1, 2, . . . 8. A picture at the base end of an arrow is used as a reference picture for compressing the picture at the arrow point end of the arrow. As shown, the B pictures reference both I and P pictures positioned before and after the B picture. The P picture references an I picture positioned before the P picture. These relationships are shown by the arrows in FIG. 17. In this example, it is possible to start data expansion at each of the I pictures indicated by frames 2 and 6. According to the MPEG method, a GOP (group of pictures) can be composed of a series of pictures comprising an I picture and other pictures directly and indirectly referenced by the I picture. A GOP header is added to each GOP. The GOP is used as a unit of random access.

Because data compression, when using B pictures, uses pictures positioned before and after the object picture as reference pictures, the order of input pictures, as well as the order of pictures in each bit stream resulting from the compression is changed.

FIG. 17 illustrates a configuration of input pictures 121 (top row) and the configuration of compressed pictures 122 (bottom row) recorded in the MPEG2 format bit stream. In this example, the picture 3, a B picture, is compressed by referencing both the I and P pictures positioned before and after it. Picture 3 is thus compressed after picture 4 is compressed. Accordingly, in the resulting bit stream the picture 3 is disposed after the picture 4.

Because the compression ratio differs among picture types for motion pictures including these I, P, and B picture types, the pictures must be controlled so that a proper amount of compression is assured for each picture type, thereby storing pictures with uniform quality. The amount of compression is changed significantly according to the characteristics of an input picture. For example, for motion pictures, the compression ratio is improved significantly if a motion vector is used for referencing a picture. It is thus possible to compress pictures with uniform quality if the amount of compression is allocated less for P and B pictures, and more for an I picture. If motion pictures to be compressed have many regions whose shapes are changed with time, the compression ratio is not raised even when a motion vector is used. Such a control method is disclosed in "ISO-IEC/JTC1/SC20/WG11 Coded Representation of Picture and Audio Information Test Model 5," which is one MPEG2 compression method. According to this model, the number of I, P, and B pictures to be compressed is temporarily determined before compression is started, then the amount of compression for the next GOP is decided from the result of the previous compression for each GOP. A coefficient (quantization coefficient) indicates the degree of compression.

Because compression methods of different types can be combined to encode pictures at a high compression ratio, it is possible to record a large number of motion picture frames in a disk medium such as a hard disk drive. For example, if MPEG2 is used for compressing the NTSC signal used for TV broadcasting, which includes about 200 Mbps data, the NTSC signal can be compressed up to about 4 Mbps. Thirty-three minutes of compressed data can be stored on a hard disk having a capacity of only one gigabyte, although the data can be stored only for 40 seconds before it is compressed. Consequently, the method makes it possible to record motion pictures on disk media instead of the conventional tapes used for recording motion pictures.

SUMMARY OF THE INVENTION

The MPEG2 methodology begins data expansion at an I picture. If a picture entered earlier than an I picture is compressed as a B picture, however, this B picture is disposed after the I picture in the resulting compressed bit stream. This B picture can also reference an I or P picture disposed before itself Such a recording method can be adopted for a portion of the motion picture preceding an event. If a bit stream is composed of pictures after this I picture and its subsequent pictures, there is a possibility that a picture that references a picture disposed before itself is included in the bit stream. If recording of pictures on a medium is started while such a B picture is fetched, the first picture in the bit stream will not be decompressed when reproduction is performed.

The present invention provides a motion picture recording apparatus that records motion pictures accurately even at the time a specified start recording command is received, because bit streams including pictures disposed before the start command are recorded. Preferably, the invention uses a compression method that compresses pictures disposed before and after an object picture as reference pictures.

This invention also provides a motion picture recording apparatus that can record data received before a start recording command, as well as data received after the start recording command, on a recording medium in an apparatus used for compressing and recording the motion pictures.

The present invention further provides a motion picture reproduction apparatus that reproduces pictures recorded after a start recording command is received by using the data recorded on a recording medium before the start recording command was received.

To achieve the above, the invention provides a motion picture recording/reproduction apparatus used to record compressed motion picture signals on a recording medium as described below.

When in a recording operation, a first mode (temporary recording mode) and a second mode (actual recording mode) are set before a recording start signal is received from an operator or another source. The first mode is used for pictures before the recording start signal is received, while the second mode is used for pictures after the recording start signal is received. The first and second modes are separated by the start recording operation. Of course, if desired, the recording and compression techniques can be changed between these modes depending upon the purpose of the recording.

According to the present invention, motion picture data are compressed and recorded on a recording medium in the first mode when a temporary start recording command is received. The timing of the start of the temporary recording can be set based on the purpose of the recording. The compressed data can be recorded on various recording media including a main memory, a cache memory, a semiconductor memory, a magnetic disk, etc., as provided in the apparatus.

Later, after the actual start recording command received from an operator or some other source directing the operation, motion picture data are compressed in the second mode. Although the MPEG method may be used for this compression, other motion picture compression methods may also be used. The pictures compressed in the second mode are then recorded on a recording medium, just as in the first mode. Just as in the first mode, any recording media can be used as appropriate to the recording purpose. The timing of the shift from the first mode to the second mode is also recorded at a specific region of the recording medium. This allows the operator or the source directing the operation to identify the recorded data from which the intended recording processing (second mode) is started in a reproduction operation.

DESCRIPTION OF THE SPECIFIC EMBODIMENTS

Figures 19A, 19B:
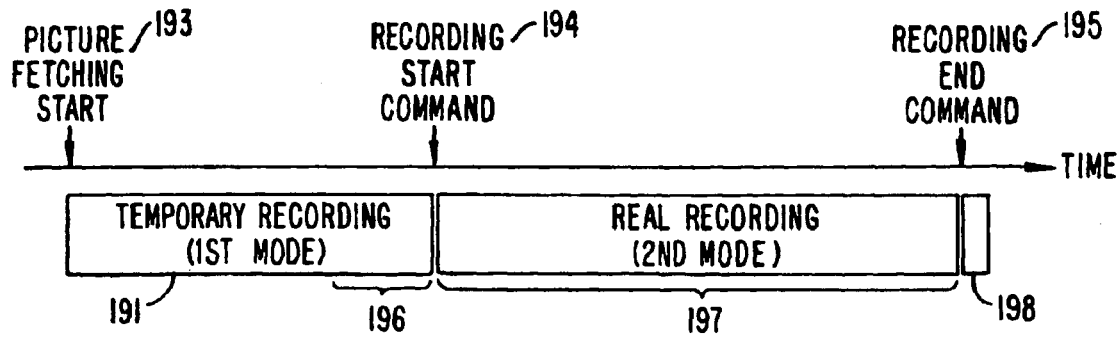
FIG. 19A and FIG. 19B illustrate the concept of how motion pictures are recorded in an embodiment of the present invention.

FIG. 19A illustrates how motion pictures or audio are recorded in one embodiment of the present invention. In FIG. 19A, the horizontal axis indicates the passage of time. When fetching or retrieval of pictures is started (193), which as will be explained occurs even before the user chooses to record, the motion picture recording/reproduction apparatus processes received pictures in a first mode. Because the user has not directly specified recording of the data in this first mode, the recording of data in the first mode is referred to as "temporary recording" herein. This processed data are temporarily stored in a buffer memory or stored on a recording medium. After that, if a start recording command 194 is received, pictures are processed in a second mode. Because recording of the data processed in this second mode is specified directly by the user, the recording is referred to herein as "actual recording." In this second mode, the compression processing can be changed from that set in the first mode. Not only the pictures (197 in FIG. 19A) in the second mode, but also the pictures (196 in FIG. 19A) entered just before the start recording command 194 is received are recorded together on a recording medium during compression processing such as MPEG. The pictures 196 may be a portion of pictures 191, or the entire pictures 191 may be recorded.

Unlike tape media, disk media make it possible to read and write picture data at any position on the media. Using this characteristics of disk media allows beginning temporary recording before an event (start recording event), then continuing the recording after the event. Before the event, data can be overwritten sequentially in older recording regions until the start recording event is received. If the start recording event is received, the disk media allow continued recording of subsequent pictures, while the recording region of a predetermined length, used before the starting recording event is received, remains. The relationship between the start of fetching a picture 193 indicating this temporary recording and the start recording command 194 can be varied according to the device in use, as shown in FIG. 19B.

For example, for a video camera that uses a disk recording medium, fetching of pictures can start when the video camera is first turned on, or set in the stand-by status (the recording pause status). When the operator presses the RECORD button, the video camera regards the time of the RECORD button ON as a start recording command 194. In another example, for a security camera, fetching of pictures may be started when power is supplied to the security camera to begin monitoring. When any event is detected (e.g., a breaking glass sound is heard, a person is sensed by an infrared beam, or vibrations of a monitoring device are detected), the event detected may be defined as a start recording command. For a monitoring camera mounted on a car, fetching of pictures may start when the car's engine is started. An impact, a vibration sensed on the car, or other indicia, can be used as a start recording command. FIG. 19B illustrates several examples for the temporary recording and actual recording events.

As described above, the present invention makes possible recording of pictures on a recording medium before an event (the "start recording event") indicating a start recording time. If such an event occurs, the present invention makes possible continuing the recording of subsequent occurring pictures while the recording made before the occurrence of the event is left as is.

For example, a loud sound may be sensed while pictures taken by a security camera are recorded. If it is desired that pictures are to be recorded for 10 minutes before and after the event (loud sound), the above recording method will be effective, because pictures can be recorded for a predetermined time preceding the loud sound. Herein, such recording is called "before-event recording."

For a stay-at home video disc recorder, fetching of pictures may be started when power is supplied to the recorder or a channel is selected by an operator. When the operator press the start button, the recorder define it as a start recording command.

Figure 1:
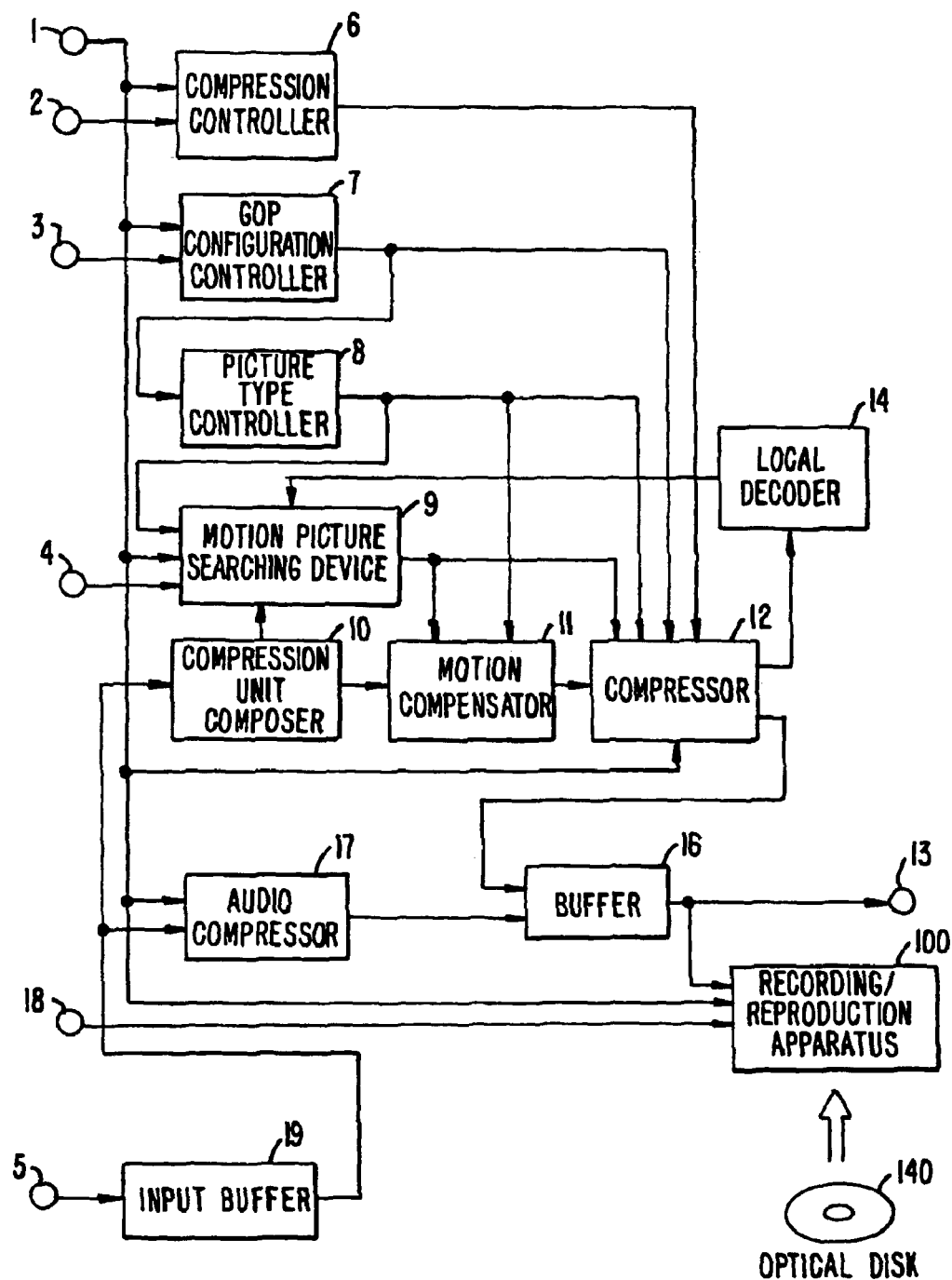
FIG. 1 is a block diagram of a signal processor provided with a motion picture compression function in an embodiment of the present invention.

Next, the signal processor block diagram shown in FIG. 1 is described. An input terminal 1 receives a signal directing a change of recording operation types. A change of start recording operation type means fetching of a command for an operation type when fetching of pictures is started (193) or when a start recording command 194 is received. An input terminal 2 is used to receive a signal indicating a recording period for MPEG compression processing. An input terminal 4 is used to receive a signal controlling an operation period of motion vector searching during an MPEG compression processing.

An input terminal 5 is used to receive video and/or audio signals in analog or digital. Compression controller 6, GOP configuration controller 7, and picture type controller 8 are used to control operation during dynamic or static picture compression. The recording/reproduction apparatus 100 includes a data recording apparatus such as an optical disk unit (including DVD and CD-R/RW), a magnetic disk storage unit, a magnetic tape unit, a semiconductor memory, or the like. In FIG. 1, an optical disk 140 is used. Although not illustrated in FIG. 1, the recording/reproduction apparatus 100 includes recording devices, recorded data management type controllers, and recording failure detectors used to detect failures of recording, and recording repeaters used to repeat recording if a recording processing fails. A buffer 16 is used to temporarily store compressed picture and audio data. For example, buffer 16 may comprise a semiconductor memory such as RAM, flash card memory, etc. An input buffer 19 is a memory used to store digital video signals and/or digital audio signals temporarily. A recording period command input terminal 18 is used to control recording of data into the recording/reproduction apparatus 100.

Operation of the signal processor in the above embodiment is described next. Motion pictures received at the input terminal 5 are compressed to the picture types controlled by the picture type controller 8. They are also composed as a GOP as decided by the GOP configuration controller 7. The input buffer 19 may be omitted. The GOP configuration controller 7 composes the GOP as described below according to the signal from the GOP configuration controller input terminal 3 and the signal from the operation type command input terminal 1.

Figure 2:
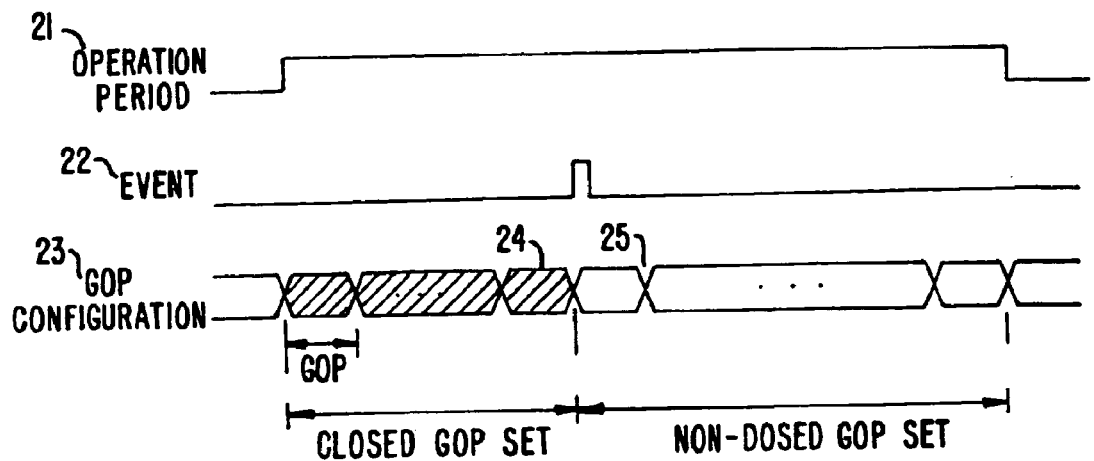
FIG. 2 is a timing chart for an operation of GOP configuration directing in an embodiment of the present invention.

FIG. 2 is a timing diagram to illustrate operation of the GOP configuration controller 7. Reference numeral 21 indicates a signal entered from the GOP configuration controller input terminal 3 and numeral 22 indicates a signal entered from the operation type command input terminal 1. Reference numeral 23 designates a signal indicating a GOP configuration, as supplied by the GOP configuration controller 7. In this timing diagram, pictures are compressed as a closed GOP before the start recording event is received. After the start recording event is received, pictures are compressed independently of GOP configuration. The picture type controller 8 controls the type of each picture so that the pictures are composed as a GOP.

Figure 3:
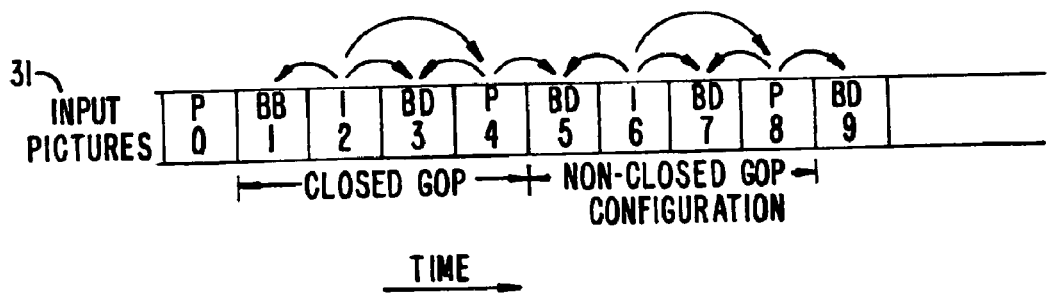
FIG. 3 is a configuration of picture types such as a closed GOP, etc. in an embodiment of the present invention.

The operation of the picture type controller 8 is described with reference to FIG. 3. In FIG. 3, picture types comprise both closed GOP and non-closed GOP. In FIG. 3, reference numeral 31 indicates a picture type configuration composed in the order entered. I, P, BB, and BD indicate I picture type, P picture type, B picture type which does not reference a picture disposed before itself, and a B picture type that references pictures both before and after itself. A closed GOP comprises pictures 1 to 4. The B picture disposed at the initial position of this GOP does not reference picture 0, so it is a closed GOP. A closed GOP flag is set in the GOP header for each closed GOP. This flag assures that the B picture at the initial position of the GOP does not reference a picture disposed before it. On the other hand, a non-closed GOP comprises pictures 5 to 8. The first picture 5 in this GOP references picture 4, so this GOP 5 is not a closed GOP.

Figure 4:
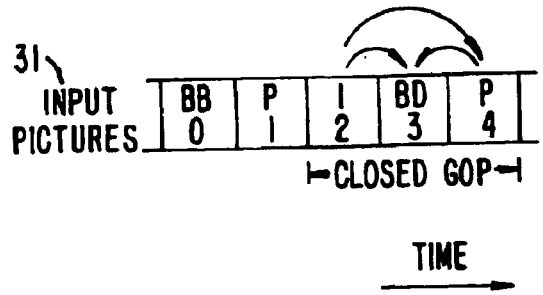
FIG. 4 is another configuration of picture types in a closed GOP in an embodiment of the present invention.

FIG. 4 illustrates another configuration of a closed GOP. The reference numerals have the same meaning as those shown in FIG. 3. In this example, an I picture is the first of the closed GOP pictures in the order received. Because the GOP comprising pictures 2 to 4 does not reference any picture in the preceding GOP, the GOP is a closed GOP. As described in the above examples, because pictures are compressed as closed GOPs until the start recording event command is received, decompression of those pictures can be started normally at any GOP boundary.

Figure 5:
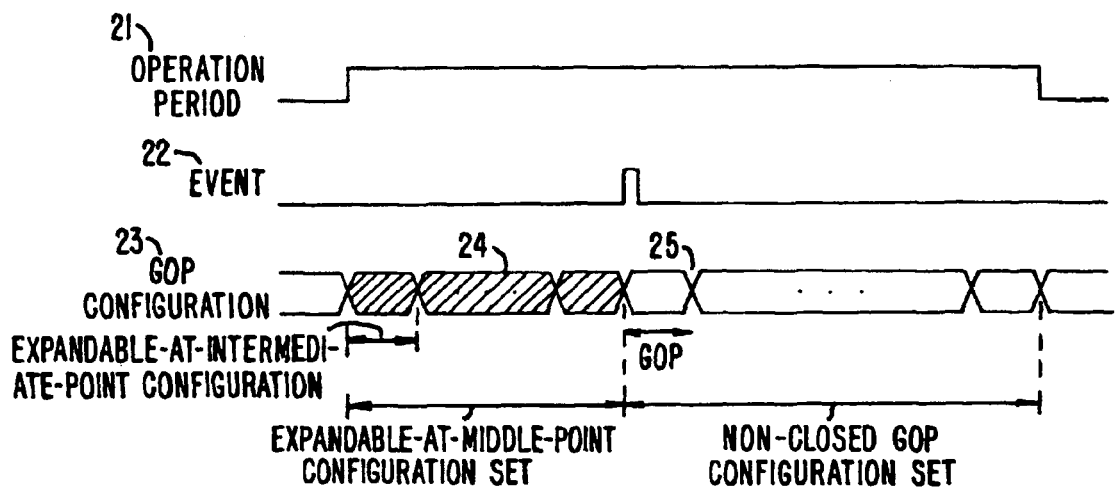
FIG. 5 is a timing diagram illustrating operation of the GOP configuration controller in an embodiment of the present invention.

FIG. 5 is another timing chart illustrating operation of the GOP configuration controller 7. Reference numerals in FIG. 5 have the same meaning as those shown in FIG. 2. In FIG. 5, picture types are arranged so that any picture that references a picture disposed before a predetermined I picture is not included in the object bit stream before the start recording event command is received, just as in a closed GOP. The predetermined I picture is a picture at which decompression is started.

Figure 6:
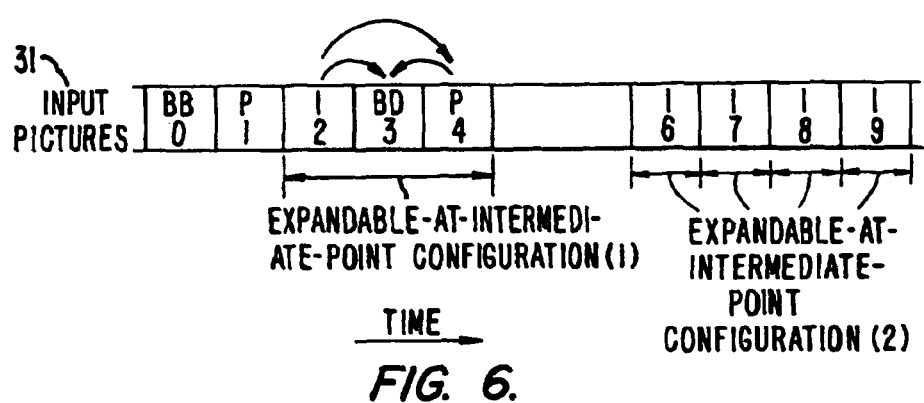
FIG. 6 is a configuration of pictures in an embodiment of the present invention.

FIG. 6 illustrates a configuration of pictures in this period enabling decompression of pictures from an intermediate position. The reference numerals in FIG. 6 have the same meaning as those shown in FIG. 3. In FIG. 6, the configuration (1) enables data decompression beginning at an intermediate point and includes a B picture which does not precede any I picture. The pictures in the configuration (1) can thus be decompressed normally, even when a closed GOP flag is not set in its header. The configuration (2) enables data decompression at an intermediate point and comprises I pictures only. In such a configuration (2), decompression of pictures can be started at any of those I pictures even when no closed GOP flag is set in its GOP header. If those pictures are composed as a GOP led by a GOP header in which a closed GOP flag is set, the configuration becomes like that shown in FIG. 4.

Figure 7:
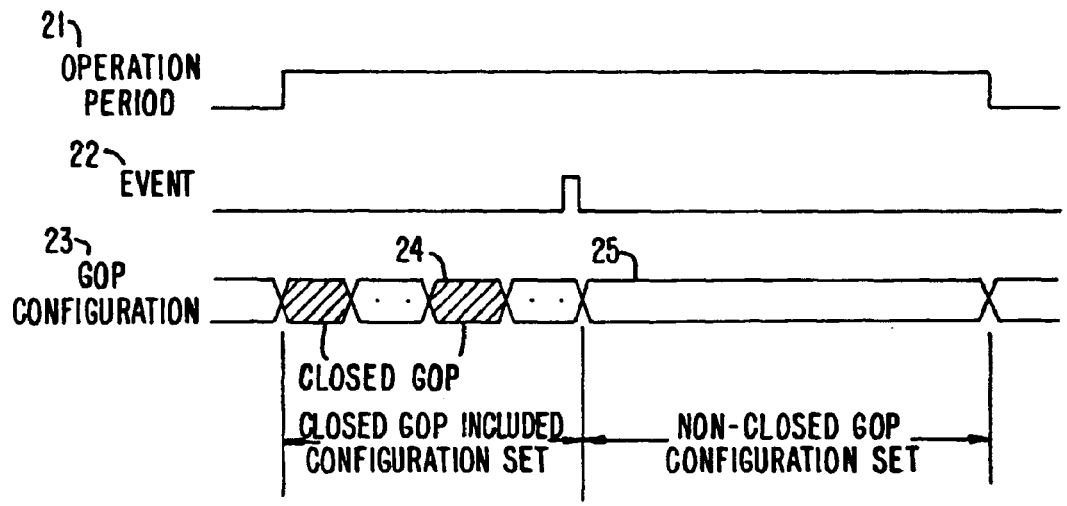
FIG. 7 is another timing diagram indicating an operation of the GOP configuration controller in an embodiment of the present invention.

FIG. 7 is another timing diagram illustrating operation of the GOP configuration controller 7. The reference numerals in FIG. 7 have the same meaning as those shown in FIG. 2. In FIG. 7, at least some of GOPs are closed GOPs before a start recording event command is received. Those GOPs can be decompressed normally if decompression is started at any of the closed GOPs.

Figure 8:
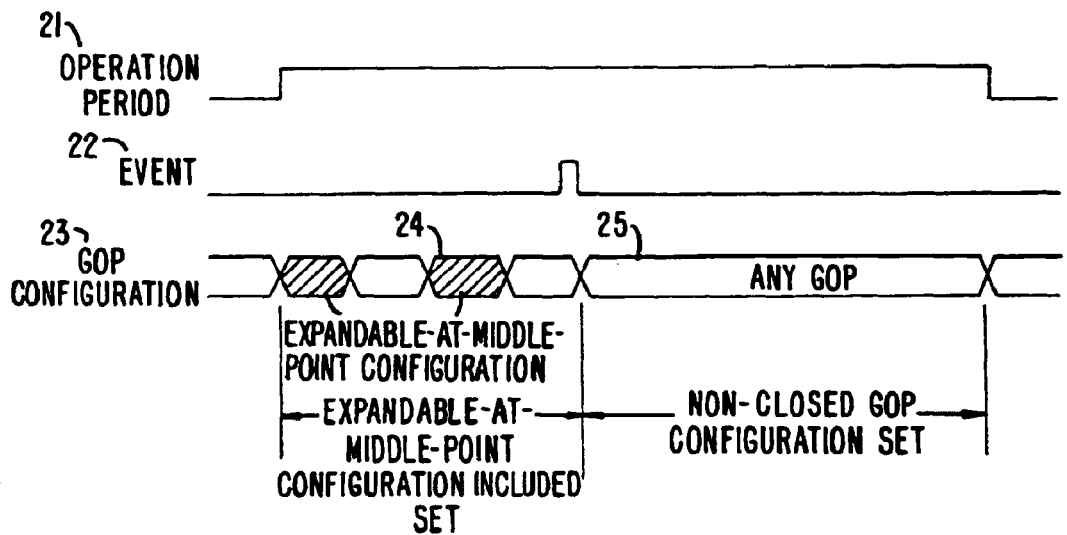
FIG. 8 is another timing diagram indicating an operation of the GOP configuration controller in an embodiment of the present invention.

FIG. 8 is another timing diagram illustrating operation of the GOP configuration controller 7. The reference numerals in FIG. 8 have the same meaning as those shown in FIG. 2. In FIG. 8, at least some of the picture configurations assumed before the start recording event is received can be decompressed starting at an intermediate point, like the example shown in FIG. 5. Picture configurations in this section are like those shown in FIG. 6. Pictures can be decompressed normally, enabling decompression of data starting from an intermediate point.

According to the picture type configuration described above, the motion vector searching device 9 begins searching for a picture region similar to the picture of an object macro block at a reference picture. At first, the compression unit composer 10 divides an input picture into rectangular regions (macro blocks) comprising 16×16 pixels respectively. The motion vector searching device 9 then searches a region having a luminance level closest to a predetermined one from among reference pictures in each macro block. It then defines the spatial difference between this region and an object macro block as a motion vector. Usually, the searching range is narrowed, although all the reference pictures preferably should be searched. This is because numerous processing operations are needed for such full range searching. Because an object in a picture often moves at a uniform rate, the searching range is narrowed, usually allowing searching of an object region in the same direction, and of the same size, as those of the last searched motion vector (telescopic searching). The center of the searching range of such a motion vector is referred to as a searching center.

Figure 9:
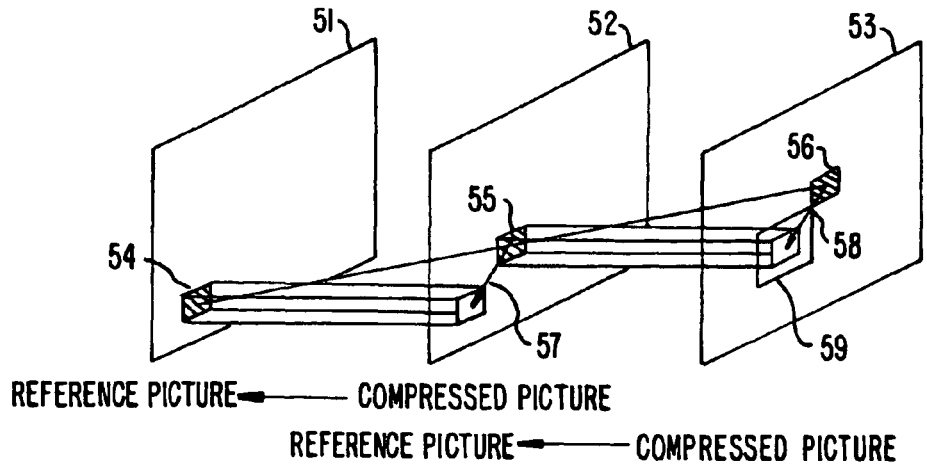
FIG. 9 illustrates a telescopic searching operation.

FIG. 9 is a diagram illustrating such telescopic searching. In FIG. 9, frames 51, 52, and 53 indicate motion pictures compressed sequentially. Picture 52 is compressed with reference to picture 51. Picture 53 is compressed with reference to picture 52. A region 55 in picture 52 has data similar to a region 54. A region 56 in picture 53 has data similar to region 55 in picture 52 If region 55 is to be compressed, first the region 54 (similar to region 55) is located in the picture 51, then region 55 is compressed using the motion vector 57 obtained as a result of the searching and the difference data between the regions 54 and 55. In the same way, region 56 is compressed using the motion vector 58 from the region 55 and the difference data between regions 55 and 56. Because a material object often moves at a uniform rate, the motion vectors 57 and 58 are often similar in direction and size. Consequently, if the location of motion vector 57 is already known, motion vector 58 likely will be in the neighboring region 59 of a vector in the same direction and of the same size. Thus there is no need to search the motion vector 58 for the entire image. Because the searching range is narrowed, the present invention significantly reduces both circuitry and power consumption of the apparatus. As for the picture at which the processing is started, searching is done in a region predetermined around a vector length 0; there is no motion vector for the first picture. For subsequent pictures, however, the searching range is determined according to the previous searching result described above, thereby narrowing the searching range and searching the object vector accurately.

Figure 10:
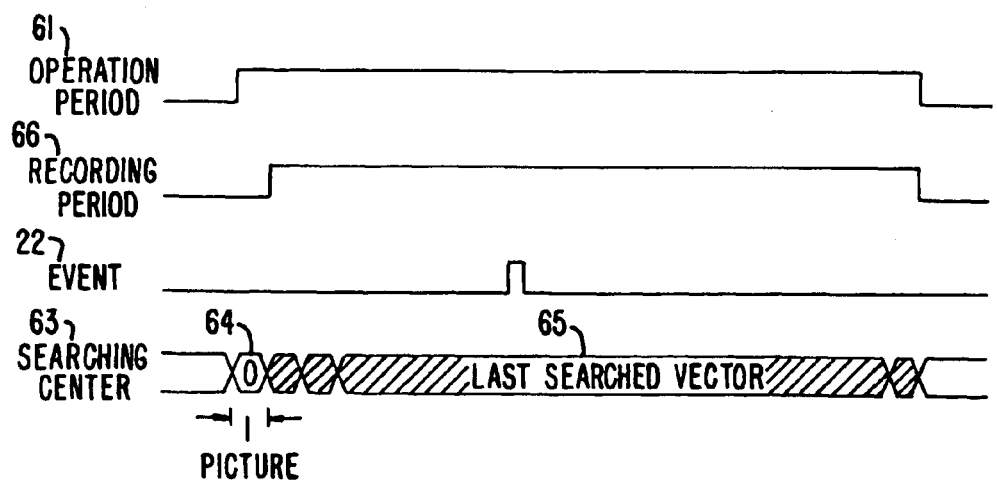
FIG. 10 is an example of how the center of the searching range is shifted in a motion vector searching controller in an embodiment of the present invention.

In this embodiment, the motion vector searching period command 4 is entered for a picture disposed before the object picture, thereby beginning searching of a motion vector prior to the recording processing. FIG. 10 is a diagram which shows how the searching center of the motion vector searching device 9 is shifted in this embodiment. In FIG. 10, signal 61 is a signal entered from the motion vector searching period command input terminal 4 and signal 22 is a signal entered from the operation type command input terminal 1. Reference numeral 63 indicates the searching center of the motion vector searching device 9, while reference numeral 64 indicates the searching center of a picture at which the motion vector searching is started. Reference numeral 65 indicates the searching center of the subsequent pictures and numeral 66 indicates a signal entered from the recording period command input terminal 18. Just after motion vector searching is started, the searching center vector length is 0. Afterward, however, the searching center becomes a vector obtained as a result of the last motion vector searching. The searching is thus made around the searching center decided as described above. According to the present embodiment, because motion vector searching can be started prior to a start recording event, it is possible to search the object motion vector in a properly narrowed range when a start recording event is generated. In addition, when temporary recording is started prior to the start recording event, it is possible to search for the object motion vector around a proper vector, because searching of a motion vector can be started around a proper vector when recording processing is started if a signal is received from the motion vector searching period command input terminal 4 prior to the signal from the recording period command input terminal 18, as shown in FIG. 10.

The motion compensator 11 then compensates for the motion using the motion vector obtained with the above method. A motion compensator obtains a luminance level difference between a macro block to compress a picture from the reference picture. In addition, the compressor 12 performs compression processing such as orthogonal conversion, quantization, and variable length compression, etc. for this difference and motion vector data. The orthogonal conversion process divides a macro block into regions comprising 8×8 pixels and performs a two-dimensional DCT processing on each of those regions, thereby performing an orthogonal conversion for a spatial frequency component. This processing generates a signal string having an amplitude distribution so that the amplitude of the spatial frequency component is lower than that of the natural picture characteristics, while the high spatial frequency component has small amplitude. The quantization processing divides each of those signal strings by a predetermined value for each spatial frequency, then divides the result by a constant referred to as a quantization coefficient, specified for each macro block, thereby minimizing the amplitude of the object signal. This quantization coefficient can be used to control compression ratios. Increasing the quantization coefficient reduces each signal after the dividing and improves the compression ratio, because a larger value is used for dividing, but distortion is also increased by quantization. Reducing this quantitation coefficient lowers the compression ratio, while the signal amplitude remains large, because a smaller value is used for the dividing, but the distortion caused by the quantization is reduced. Because a picture obtained by decompressing a compressed bit stream is a picture whose data are reduced through quantization around a high spatial frequency component, the picture is different from the original one. Because this picture is used as a reference picture, the compression device must also create a picture obtained as a result of decompressing a bit stream. Consequently, local decoder 14 creates a picture whose bit stream is already decompressed. The local decoder 14 can also use a variable length compressed bit stream or quantized data for which no variable length compression is performed yet as the data for creating a reference picture. The target value of the amount of compressing is specified by the compression amount controller 6. A method for obtaining this target value amount of compression is described in the above document. According to this method, how much the I, P, and B pictures are to be compressed is determined temporarily before the object compression is started, and the compression amount allocation for the next GOP is determined from the compression amount obtained as a result of actual compression and the quantization coefficient indicating the degree of compression each time a GOP is compressed.

Figure 11:
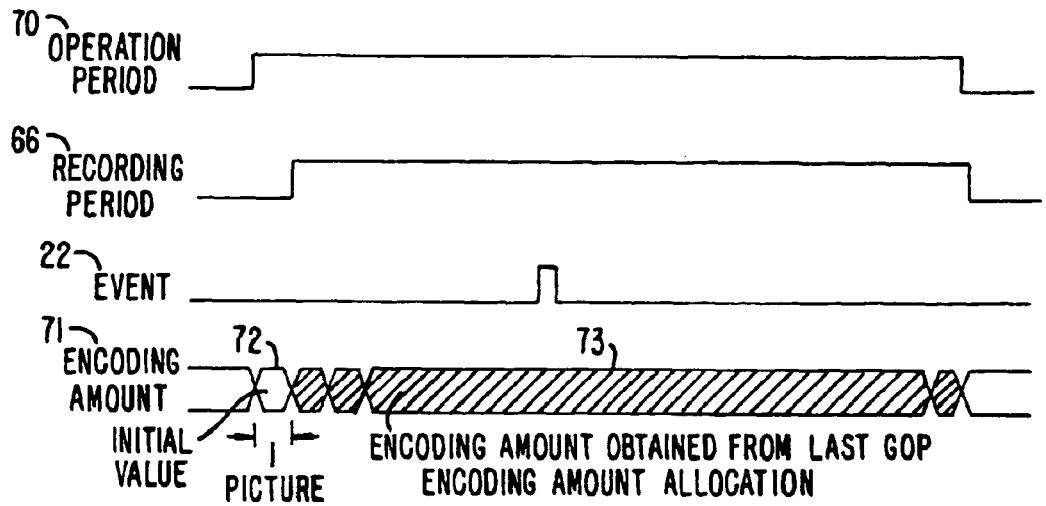
FIG. 11 is an example of how the compression amount allocation is changed for each picture type by a command issued from the compression amounts controller in an embodiment of the present invention.

FIG. 11 is a timing diagram of the operation of the compression amount controller 6 in this embodiment. In FIG. 11, numeral 70 indicates a signal entered from the compression controller input terminal 2 and reference numeral 22 indicates a signal entered from the operation type command input terminal 1. Reference numeral 71 indicates an compression allocation signal from the compression controller 6. Reference numeral 72 indicates an compression amount allocation of I, P, and B pictures in a GOP just after the compression controller command is received. Reference numeral 73 indicates an compression allocation of pictures in a subsequent GOP. Reference numeral 66 indicates a signal entered from the recording period command input terminal 18. Just after an compression controlling period command is received, the compression amount allocation of I, P, and B pictures is decided by a predetermined initial value. Thereafter, however, compression processing is performed according to an compression allocation found through a predetermined arithmetic operation from an compression amount and a quantization coefficient obtained as a result of actual compression. According to this embodiment, because control of the compression can be started prior to the start recording event, an optimized compression amount can be allocated for compression processing performed prior to the start recording event. In addition, even when a temporary recording processing is executed prior to the start recording event, the compressing can be started prior to the signal entered from the recording period command input terminal 18, thereby executing compression processing with proper compression amount allocation.

Figure 12:
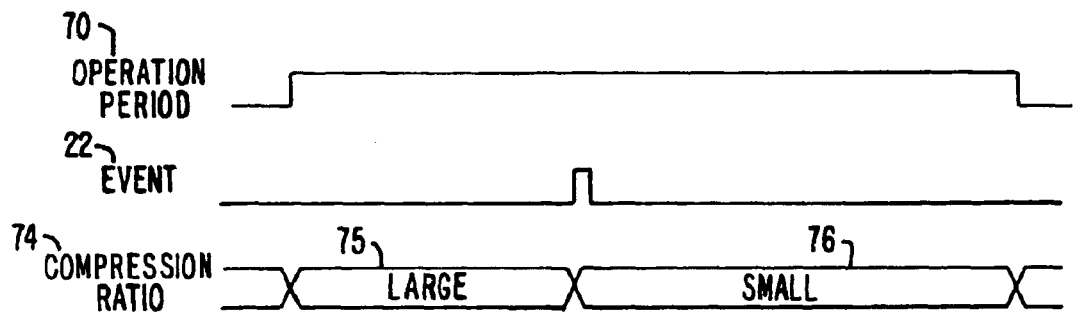
FIG. 12 shows how the compression ratio is changed in an embodiment of the present invention.

FIG. 12 is another timing diagram indicating operation of the compression controller 6 in this embodiment. In FIG. 12, numeral 70 indicates a signal entered from the compression controller input terminal 2 and numeral 22 indicates a signal entered from the operation type command input terminal 1. Reference numeral 74 indicates a compression ratio indicated by an output from the compression controller. Reference numeral 75 designates a compression ratio used before a start recording event is entered. Reference numeral 76 designates a compression ratio used after a start recording event is entered. In this example, a high compression ratio is used for compression before a start recording event is entered. After a start recording event, a predetermined compression ratio is used for compression. The compression controller 6 controls the compression for each picture so that the compression ratio is changed as described above, before and after the start recording event. Consequently, an optimized compression ratio can be used for compression when data must be stored for a long time, tolerating slight degradation of the picture quality before the start recording event at which time data must be compressed with less degradation. In such a case, a large compression ratio is used for recorded pictures before the start recording event, enabling the compression processing to be executed optimally. This is because the compression is done at a higher compression ratio as regulated in MPEG1, H.261, etc.

Figure 13:
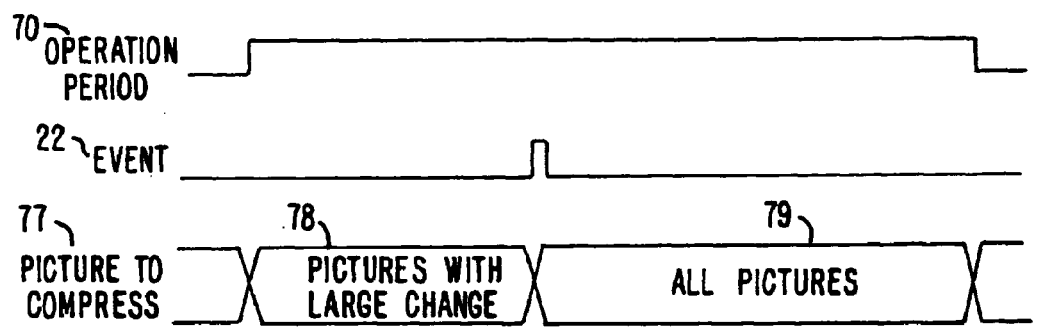
FIG. 13 illustrates an example of how pictures to be compressed are changed in the compressor in an embodiment of the present invention.

FIG. 13 is a timing chart indicating another operation of the compression controller 6. In FIG. 13, numeral 70 indicates a signal entered from the compression controller input terminal 2 and numeral 22 indicates a signal entered from the operation type command input terminal 1. Reference numeral 77 indicates the characteristics of a picture to be compressed by the compressor 12. Reference numeral 78 indicates the characteristics of a picture to be compressed before the start recording event. Reference numeral 79 indicates the characteristics of a picture to be compressed after the start recording event. In this example, only the pictures whose amplitudes are changed largely with time are compressed as static pictures before the start recording event is entered, while other pictures are discarded without compression. After the start recording event, all the pictures are compressed. In this case because it is only necessary to record a rough motion trend of each picture before actual recording starts, the compression processing can be executed. In this case, it is also possible to handle pictures recorded before the start recording event as static pictures, so each picture can be processed more easily if such a static picture compressing method as JPEG, etc., is used for compression.

A bit stream generated as described above is adjusted for timing in the buffer 16 and output from the output terminal 13 or recorded in the recording/reproduction apparatus 100. The recording period is controlled by the recording period command input terminal 18.

Signals entered from the input terminal 5 are compressed in the compressor 17 as predetermined by MPEG. The signals are then adjusted for timing in the buffer 16 and output from the output terminal 13, or recorded in the recording/reproduction apparatus 100 just as motion picture signals. When in audio or voice compression, it is also possible to change the compression ratio before and after the starting event.

Figures 14, 15:
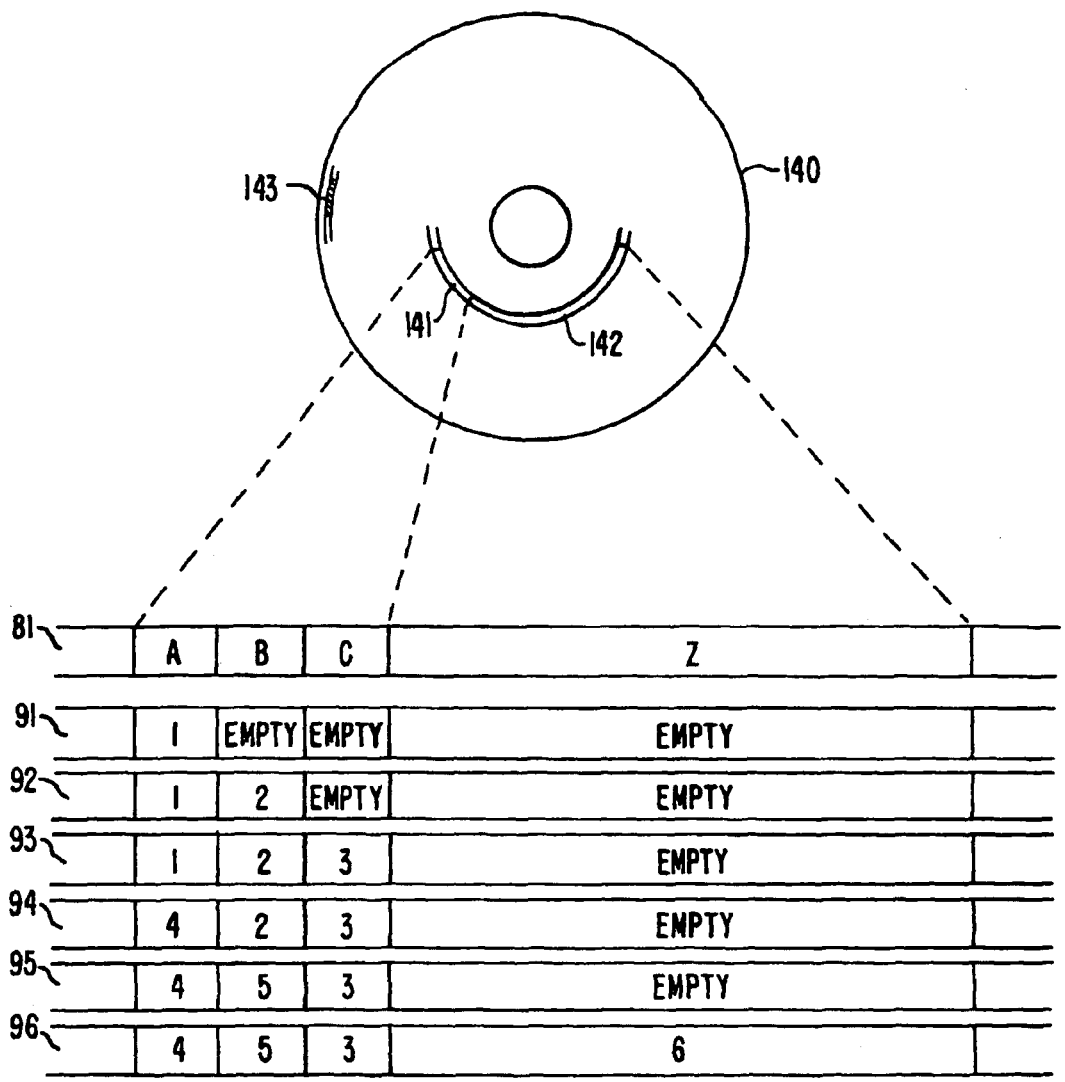
FIG. 14 illustrates an example of how pictures are recorded on a recording medium in an embodiment of the present invention.
FIG. 15 illustrates another example of how pictures are recorded on a recording medium in an embodiment of the present invention.

The recording/reproduction apparatus 100 records data in divided regions based on the start recording event. FIG. 14 illustrates how data are recorded in the recording/reproduction apparatus 100. The optical disk medium 140 has a plurality of recording regions disposed from inner periphery to outer periphery. A first recording section 141 is used to record temporary data and a second recording section 142 is used to record real data. Reference numeral 81 indicates details of the first and second recording sections 141 and 142. The recording region names are represented as A, B, C and Z. The first recording section 141 includes three regions A, B, and C (data blocks or sectors) and the second recording section 142 includes a continuous long region Z which can span multiple sectors. Reference numerals 91 to 96 indicate time-series recording processes for those regions. In this example, data items 1 to 5 are recorded sequentially in predetermined regions, before the starting event. The data 6 are recorded in a predetermined region after the start recording event. In FIG. 14, regions A to C are for recording a bit stream before a start recording event is entered. Z is a region for recording a bit stream after the start recording event. The size of each of those regions may be changed. Reference numeral 95 denotes a data disposition example for the start recording event. Before the start recording event, data are written in the regions A, B, and C cyclically. At this time, each of the regions A, B, and C are controlled so that the region is rewritten individually and data items are recorded in each of those regions so that data items can be decompressed in units of a GOP. After the start recording event command, the bit stream is written in the region Z. The bit stream is not necessarily written in units of a GOP. Unlike the regions A to C, the region Z is not necessarily rewritten. After such a recording processing is executed, bit streams 3 to 6 are left on the recording medium. These bit streams are streams 3 to 5 written before the start recording event command, and a bit stream 6 written after a start recording event command. Those bit streams are obtained as a result of compression of continuous motion pictures.

On the disk medium is also recorded data indicating how the data stored in the medium is disposed. This information is referred to, for example, as a FAT (File Allocation Table) or TOC (Table of Contents), where the name, characteristics, access right, etc. of object data are recorded in a predetermined position on the medium, for example, in the region 143. The FAT 143 includes temporary recording regions, real recording regions, overwriting regions among temporary recording regions, recording order information, etc. When recording, this information can be used to decide respective regions to be written. In reproduction, they can be used to decide the order of reproduction.

FIG. 15 is another example of how data are recorded in the recording/reproduction apparatus 100. Reference numeral 83 indicates recording regions represented by A to Z. The number of these recording regions is arbitrary. Reference numerals 101 to 106 are charts indicating time-series recording processes. In this example, bit streams 1 to 5 are recorded sequentially in predetermined regions before a start recording event command is entered. A bit stream 6 is written in a predetermined region after the start recording event command. In FIG. 15, data are disposed as indicated by 105 when the start recording event is received. In this example, bit streams are written sequentially in the regions A to Z before and after the start recording event, that is, the recording regions are not separated. Of the bit streams 1 to 5 written before the start recording event, bit streams 1 and 2 comprises pictures compressed more than a predetermined time earlier than the start recording event and they may be erased or overwritten. Each of the bit streams 3 to 5 may be remained. Bit streams written after the start recording event may be recorded in the regions A and B. As a result of such recording, bit streams 3 to 6 remain on the medium. Bit streams 3 to 5 are written before the start recording event and bit stream 6 is written after the start recording event. Those bit streams are obtained from compression of continuous motion pictures. The regions A to Z can be rewritten in units of a GOP. The information about the regions A to Z is recorded in the FAT 143 as additional information. When recording, regions A, B, and C are temporary recording regions and this is recorded in the FAT 143. Region Z is a real recording region, and this is recorded in the FAT 143. In addition, information of the order of data reproduction is also recorded in the FAT 143. For example, the fact that data was written sequentially in the regions C, A, B, and Z is also recorded in the FAT 143.

Figure 16:
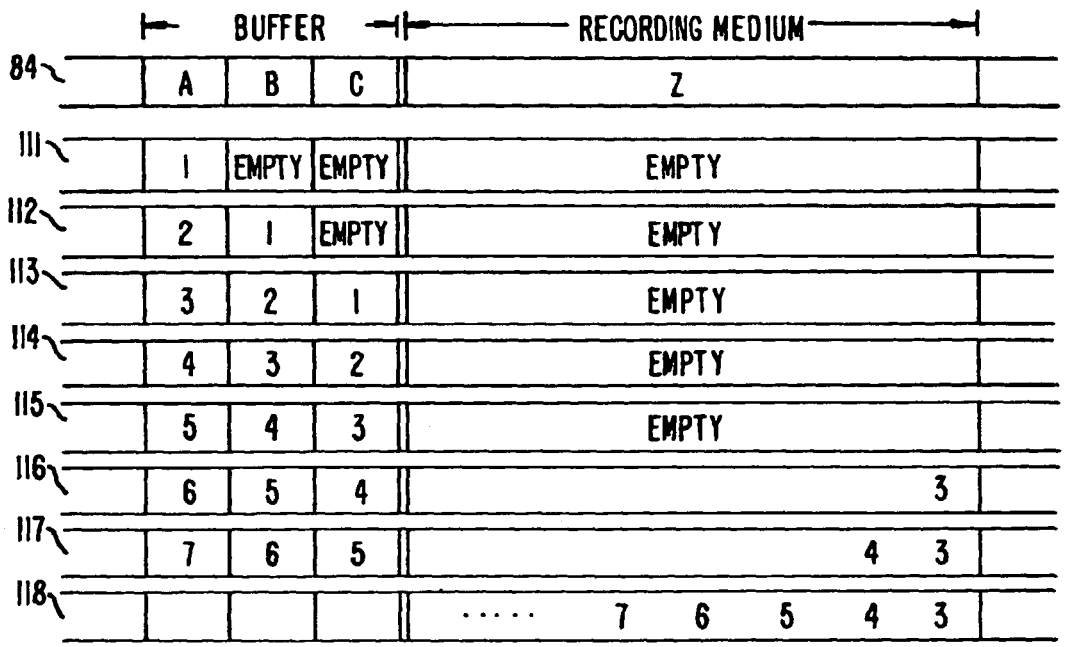
FIG. 16 illustrates another example of how pictures are recorded on a recording medium and stored in a buffer in an embodiment of the present invention.
Figure 17:
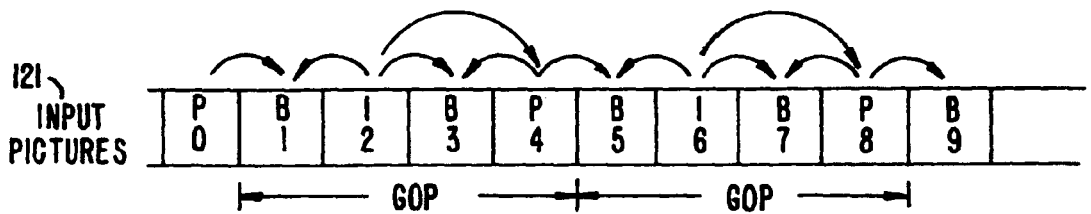
FIG. 17 illustrate the configuration of picture types in a GOP.
Figure 17:
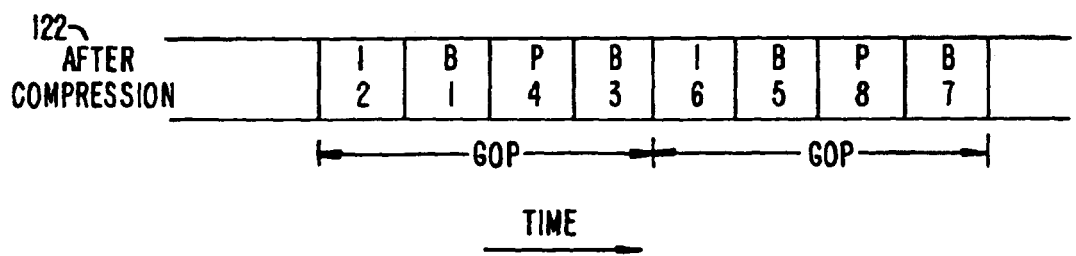

FIG. 16 is another example of how data are recorded in the recording/reproduction apparatus 100. Reference numeral 84 indicates names of the recording regions represented as A to C and Z. Reference numerals 111 to 118 indicate time-series recording processes. In FIG. 16, the bit streams 1 to 5 are written before the start recording event command is received, the bit streams 6 and 7 are written after the start recording event command is received, and subsequent data are recorded sequentially in predetermined regions. Also in FIG. 16, data are disposed as indicated by 115 at the time the start recording event command is received. Reference symbols A to C indicate recording regions provided in the buffer 16. In these regions are recorded bit streams written before the start recording event command is received. The region Z is provided in the recording/reproduction apparatus 100 and stores data transferred from the buffer 16 after the start recording event command is received. Consequently, bit streams 1 to 5 written before the start recording event command is received are stored sequentially in a buffer. When the start recording event command is received, the bit streams 3 to 5 are left in the buffer. The bit streams 3 to 5, as well as 6 and 7 are thus recorded on the object-recording medium. If data are transferred from the buffer 16 to the recording/reproduction apparatus 100 fast enough, it is possible to judge if the recording into the recording/reproduction apparatus 100 is successful or not. If it fails, the same bit streams can be transferred to the recording/reproduction apparatus 100 again. Such processing will assure recording data in the recording/reproduction apparatus. Thus, the FAT 143 stores information that data are stored in the regions A to C temporarily, together with the reproduction order information. It also stores that the region Z is used for real recording.

Although the buffer shown in FIG. 16 is provided in FIG. 1, the same benefit can be obtained by using the input buffer 19 (shown in FIG. 1) as the buffer shown in FIG. 16. If so, non-compressed pictures are written in the buffer cyclically and older data are compressed and transferred to the recording/reproduction apparatus 100 sequentially.

Figure 20:
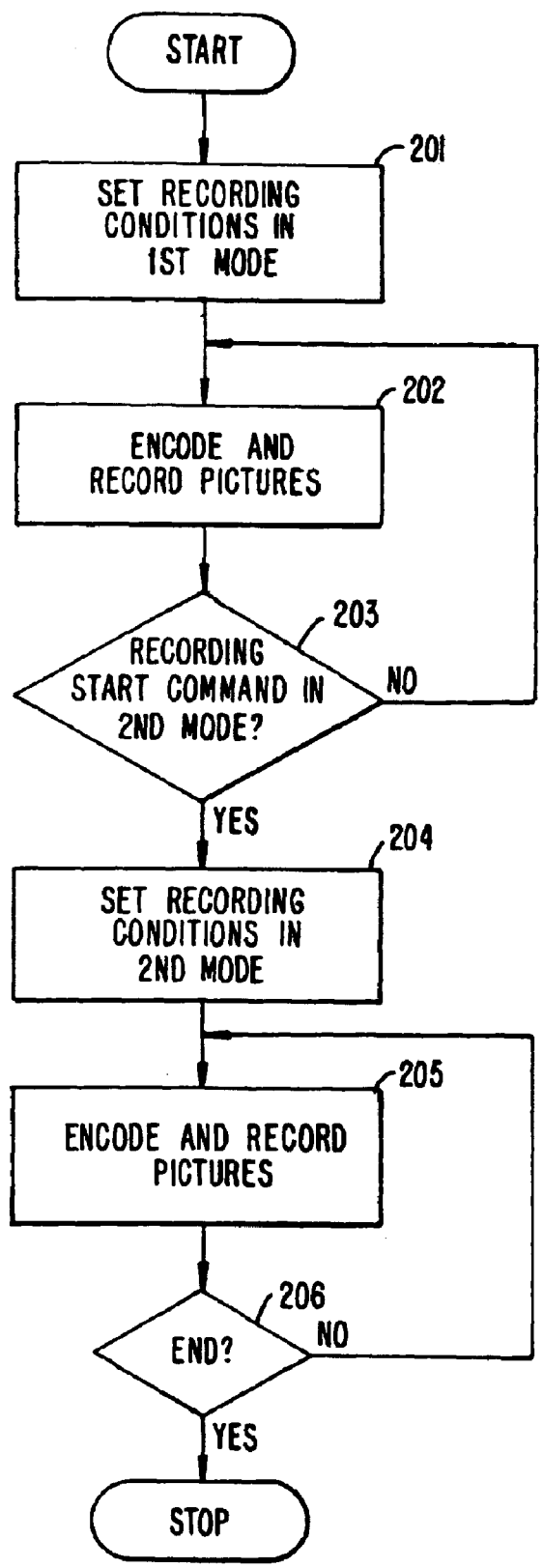
FIG. 20 is a flowchart indicating the procedures for recording motion pictures in an embodiment of the present invention.

Next, the recording procedures for motion pictures in this embodiment will be described with reference to the flowchart shown in FIG. 20. At first, when a picture fetching start command 193 is received, as described with reference to FIG. 19A, the picture recording conditions are set in the first mode (temporary recording mode). The conditions to be set at this time are compression amount, GOP configuration, picture type command, motion vector searching, compression unit, etc. It is also specified that pictures are stored in a temporary buffer or on such a medium as an optical disk, etc. (step 201). Then, pictures are compressed into MPEG data and stored on the medium. In addition, the fact that this recording is temporary is recorded in the FAT 143 when is recorded on the optical disk (step 202). After that, it is decided whether or not a start recording command 194 (described above with reference to FIG. 19A) is received. If not, the processing in step 202 is repeated (step 203). If the command 194 is received, the second recording parameters are set (step 204). The conditions to be set here are basically the same as those set in the first mode. Then, pictures are compressed into MPEG data using the parameters and stored on such a medium as an optical disk, etc. In addition, the fact that this recording is real is recorded in the FAT (step 205). The processing in step 205 is repeated until a recording end command 195 is received (step 206). For example, if a recording end command 195 is received while a picture BD is recorded like an input picture #3 shown in FIG. 3, the operation is continued until the next #4 P picture is recorded. Thus, recording is not always stopped immediately after a recording end command 195 is received.

Figure 21:
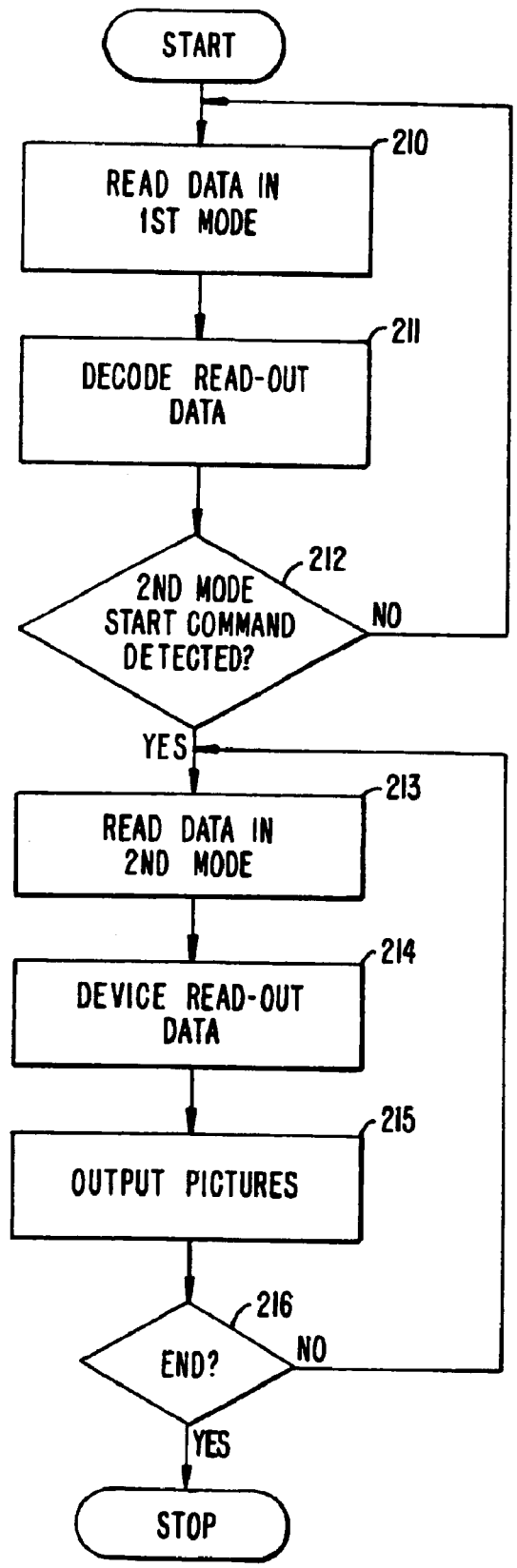
FIG. 21 is a flowchart indicating the procedures for reproduction motion pictures recorded in an embodiment of the present invention.

Next, how motion pictures are regenerated from a recording medium will be described with reference to FIG. 21. It is assumed here that pictures are recorded on the medium in both first and second modes. At first, the data are read from the FAT 143, so that the regions recorded in the first mode and the regions recorded in the second mode are recognized respectively. Then, the pictures recorded in the first mode are read according to the recognized information (step 210). This is to reference to the pictures recorded in the first mode, thereby compressing the pictures in an operation started in the second mode. The read pictures are then decoded (step 211). Because the decoded pictures are reference pictures used for the pictures recorded in the second mode, there is no need to display them on a display device (they can also be displayed if required by the user, of course). After that, it is determined whether or not a start recording command 194 indicating a starting point of the second mode has been detected. If it has not been detected, control returns to step 210. If detected, predetermined data are read from the recording medium on the conditions set for the second mode (step 213). The read pictures are decoded (step 214) and displayed on such a display device as a CRT display, etc. (step 215). In such a way, the reproduction is continued up to the last recorded picture, or stopped if directed so by the user (step 216). As described above, bit streams can be left on the recording medium after a start recording event is received as a result of the recording in this embodiment.

Figure 18:
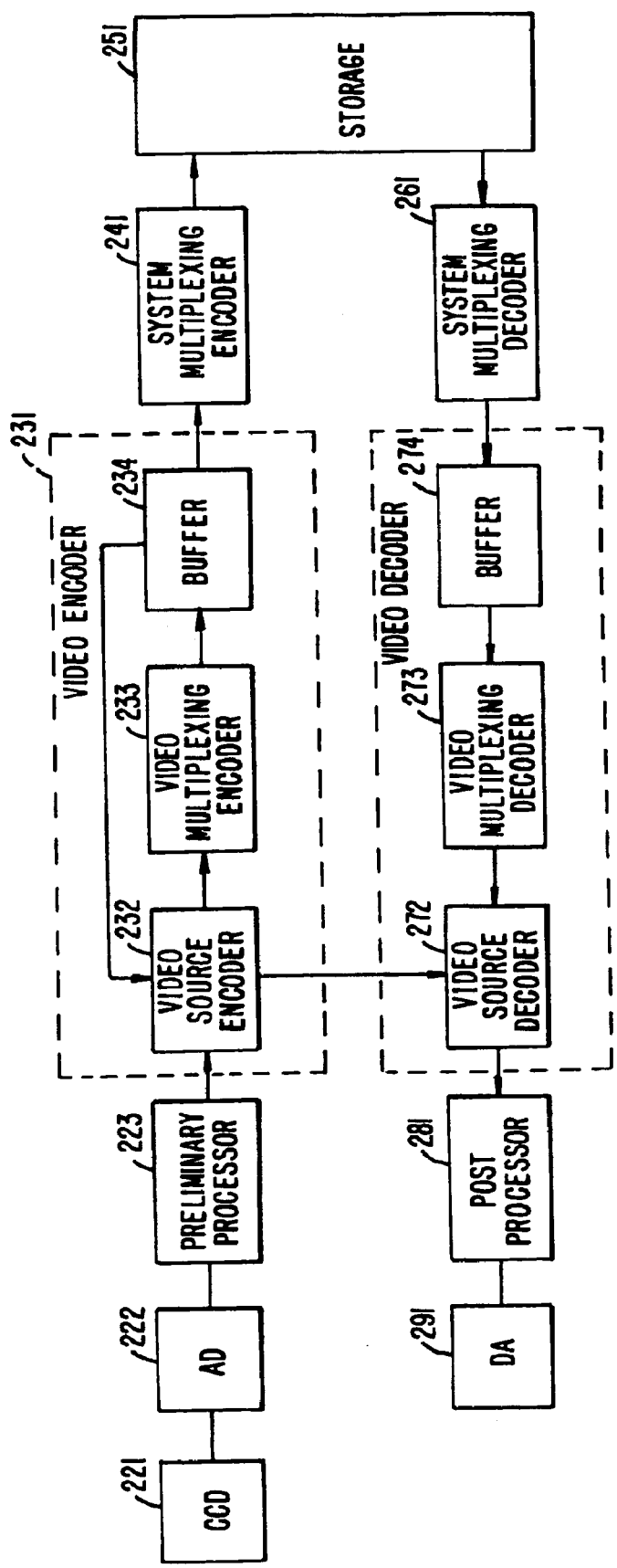
FIG. 18 is a block diagram of an MPEG camera, an example of a photographic device.

Next, a photographic device, such as a camera, used for a signal processor will be described. This photographic device is the similar structure to a Hitachi M2 multimedia recorder model MP-EG10W (Hitachi, Ltd.), for example. As shown in FIG. 18, the photographic device is provided with a CCD (Charge Coupled Device) 221, an AD 222, a preliminary processor 223, a video encoder 231, a system multiplexing encoder 241, a storage 251, a system multiplexing decoder 261, a video decoder 271, a post processor 281, a DA 291, etc. The system multiplexing encoder 241 comprises a video source encoder 242, a video multiplexing encoder 243, and a buffer 244. Picture data obtained by the CCD 221 is converted from analog data to digital data in the AD 222, then its format is converted so as to be provided with a luminance (Y) and color differences (Cr, Cb) in the preliminary processor 223. The data are then compressed in the video encoder 231 and multiplexed in the system multiplexing encoder 241 so as to be synchronized with each other when in a reproduction processing. The data are then stored in the storage 251. When in a reproduction processing, the pictures stored in the storage 251 are separated to respective pictures in the system multiplexing decoder 261 while they are synchronized with each other. After that, the pictures are decompressed in the video decoder 271 and converted in the post processor 281 so as to satisfy the specifications of the object output means, then converted from digital data to analog data in the DA 291 so as to become picture data. This device is also provided with recording function, so that it can obtain the same benefits as those of the above-described signal processor.

As described above, according to the signal processor and the photographic device in this embodiment, MPEG2 has a GOP configuration referred to as a closed GOP. This GOP configuration is characterized by even when a B picture preceding an I picture in the input order is included in a GOP, the B picture is compressed without reference to any preceding picture. In the GOP header is set a flag indicating the effect that the subject GOP is a closed one. It is thus possible to compose a bit stream without reference to any preceding picture, even for pictures recorded before a start recording event is received. This is possible if the pictures are composed as a closed GOP and the bit stream is discontinued at any GOP boundary, if a GOP configuration is changed, that is, if the usage form of the correlation among pictures is changed in a compression processing upon a start recording event used as an operation type directing command.

Because a created bit stream is recorded on a recording medium by changing the recording form before and after a start recording event, then further changing the recorded data management, the "before-event" recording can be performed. More concretely, a bit stream written before a start recording event occurs can be recorded in units of a predetermined size on a recording medium according to a command from the operation type controller so that the subject GOP can be rewritten independently. A bit stream written after a start recording event occurs is recorded according to the command from the operation type controller so that the subject GOP can be rewritten in units of a larger size.

If the recorded information management form controller can control the recording so that bit streams written before a start recording event occurs are recorded sequentially, older data are overwritten with new data as needed (when the recording region is insufficient to store all). Thus, subsequent bit streams are recorded on the object recording medium when a start recording event occurs, and the bit streams written earlier than other bit streams can be overwritten with new ones in those regions. Thus, it is possible to obtain bit streams of pictures written a predetermined period earlier than the start recording event.

In addition, for compressing pictures and audio received before such a start recording event, the compression processing is optimized for those pictures and audio. For example, because it is possible to tolerate more distortion caused by compression of pictures and audio entered before the start recording event, a high compression ratio can be used for those pictures and audio. This allows those pictures and audio to be recorded on a recording medium for a longer time. This recording is very effective if the size of the subject-recording medium is not large. In addition, it is also possible to select the pictures whose amplitudes are changed significantly from those pictures preceding start recording event, compress and store them as static pictures, and compress all the pictures and audio entered after the start recording event as motion picture data. This allows the before-event recording to be made for a longer time.

Starting compression processing before the start recording event can have the following advantages. In the case of the conventional recording method described above, fixed values are employed as the initial values of the compression allocation of each of the I, P, and B pictures. Consequently, the compression allocation is not always optimal for input motion pictures. However, according to the present invention, because characteristics of input pictures used for obtaining the compression amount allocation of each of I, P, and B pictures before the recording is started, pictures can be compressed at the optimized compression allocation according to the characteristics of those input pictures even just after the recording is started.

In addition, motion vector searching can be performed in the same way. The telescopic searching method also reduces both circuit size and power consumption of the subject apparatus. This method, however, cannot decide the search direction, because there is no motion vector just after a compression processing is started. The motion vector must thus be searched around the moving distance 0. However, it is possible to set a proper searching range from the first picture to be compressed if searching of a motion vector is started before the object compression is started.

The preceding has been a description of the preferred embodiments of the invention. It will be appreciated that deviations and modifications can be made without departing from the scope of the invention, which is defined by the appended claims.

What is claimed is:

1. A signal processor provided with a recording device used to compress and record motion picture signals, comprising:

a recording controller for directing a start of actual recording;

an operation type controller for directing a change of object operation types; and an operation type changing device for changing object operation types in compression processing according to a command received from the operation type controller, wherein the recording device records data entered before the time of actual recording controlled by the actual recording controller and the operation type changing device compresses data entered before the recording starting time according to a operation type directed from the operation type controller.

2. A signal processor in accordance with claim 1, wherein data received before the actual recording start time is entered between a time preceded by a predetermined time from the actual recording starting time and the actual recording starting time.

3. A signal processor in accordance with claim 1, wherein the operation type changing device switches between compression of a set of pictures without using the correlation with a preceding set of pictures and compression of a set of pictures using the correlation with a preceding set of pictures according to a command from the operation type controller.

4. A signal processor in accordance with claim 3, wherein the operation type changing device switches between a set of closed GOPs and a set of non-closed GOPs according to a command received from the operation type changing device.

5. A signal processor in accordance with claim 4, wherein the signal processor further includes:

a picture motion distance evaluating controller for evaluating a distance of a picture movement;

a recorded picture transmitting device for recording or transmitting pictures whose motion distances are over a predetermined value; and an evaluation threshold changing device for changing an evaluation threshold according to a command received from the operation type controller.

6. A signal processor in accordance with claim 5, wherein the signal processor further includes:

a motion vector searching device for searching motion vectors; and a searching period directing device for directing an operation period of the motion vector searching device.

7. A signal processor in accordance with claim 6, further including:

a compression amount controller for controlling an amount of compression; and an compression amount period controller for controlling an operation period of the compression amount controller, and wherein older data are overwritten sequentially with new data as new data is received.

* * * * *